United States Patent
Widmer (10) Patent No.: US 12,084,368 B2
(45) Date of Patent: Sep. 10, 2024

(54) DEVICE FOR METERING AN ADDITIVE INTO A FLUID

(71) Applicant: LRP AG, Thun (CH)

(72) Inventor: Markus Widmer, Thun (CH)

(73) Assignee: LRP AG, Thun (CH)

( * ) Notice: Subject to any disclaimer, the term of this patent is extended or adjusted under 35 U.S.C. 154(b) by 0 days.

(21) Appl. No.: 18/008,921

(22) PCT Filed: Jul. 7, 2021

(86) PCT No.: PCT/EP2021/068772
§ 371 (c)(1),
(2) Date: Dec. 7, 2022

(87) PCT Pub. No.: WO2022/008569
PCT Pub. Date: Jan. 13, 2022

(65) Prior Publication Data
US 2023/0234868 A1    Jul. 27, 2023

(30) Foreign Application Priority Data
Jul. 10, 2020 (EP) .................................. 20185351

(51) Int. Cl.
C02F 5/08 (2023.01)
A47J 31/60 (2006.01)
B01D 35/153 (2006.01)

(52) U.S. Cl.
CPC ............... *C02F 5/08* (2013.01); *A47J 31/60* (2013.01); *B01D 35/153* (2013.01);
(Continued)

(58) Field of Classification Search
CPC .................. Y10T 137/4891; Y10T 137/87587
(Continued)

(56) References Cited

U.S. PATENT DOCUMENTS 3,399,776 A * 9/1968 Knuth ................... B01D 29/96
210/420
5,607,582 A * 3/1997 Yamazaki ............ B01D 35/153
210/234
(Continued)

FOREIGN PATENT DOCUMENTS

DE   102011081010 A1   2/2013
EP      3501351 A1   6/2019

OTHER PUBLICATIONS

International Search Report and Written Opinion of PCT/EP2021/068772 mailed Aug. 25, 2021, 14 pages.

*Primary Examiner* — Robert K Arundale
(74) *Attorney, Agent, or Firm* — Hard IP LLC (57) ABSTRACT

The invention relates to a device for metering an additive into a fluid, containing a valve body, a fluid inlet, and a fluid outlet. A first channel system extends between the fluid inlet and the fluid outlet in the valve body, and a second channel system extends between the fluid inlet and the fluid outlet in the valve body such that in the operating state fluid can flow from the fluid inlet to the fluid outlet either through the first channel system or through the second channel system. The valve body contains a docking element which is configured for docking a cartridge for the additive. A switchover device is provided which can be switched if the cartridge is docked such that the second channel system is fluidically connected to the cartridge when the cartridge is connected to the docking element.

14 Claims, 7 Drawing Sheets

(52) U.S. Cl.
CPC .. *C02F 2201/004* (2013.01); *C02F 2201/005* (2013.01); *C02F 2201/006* (2013.01); *Y10T 137/4891* (2015.04)

(58) Field of Classification Search
USPC ........................................................ 239/310
See application file for complete search history.

(56) References Cited

U.S. PATENT DOCUMENTS

| | | | | |
|---|---|---|---|---|
| 5,753,111 | A * | 5/1998 | Patton | G03D 3/02 210/167.01 |
| 7,000,894 | B2 * | 2/2006 | Olson | B01D 35/147 137/594 |
| 7,387,725 | B2 * | 6/2008 | Choi | C02F 9/20 285/308 |
| 11,039,712 | B2 * | 6/2021 | Egli | B65D 85/8058 |
| 2007/0113892 | A1 * | 5/2007 | Chiriac | E03C 1/046 137/268 |
| 2014/0060338 | A1 * | 3/2014 | Tembaak | A47J 31/60 137/15.05 |

\* cited by examiner

DEVICE FOR METERING AN ADDITIVE INTO A FLUID

CROSS-REFERENCE TO RELATED APPLICATIONS

This application is a U.S. national stage filing under 35 U.S.C. 371 of international patent application no. PCT/EP2021/068772, filed on Jul. 7, 2021, which claims priority to European patent application no. EP20185351.2, filed on Jul. 10, 2020, the contents of both of which are incorporated herein by reference in their entirety.

BACKGROUND

The present invention relates to a device for metering an additive to a fluid, for example for metering an additional liquid, a gas or a solid which is soluble or dispersible in the liquid. In particular, the device is suitable for descaling a device for preparing a hot beverage. In particular, the device is configured as a valve for supplying an additive to the fluid. The device is particularly suitable for supplying the descaling agent to a water supply channel to a brewing device or a device for preparing hot beverages.

PRIOR ART

The previously known valves for metering an additive to a fluid, for example for descaling brewing devices or coffee machines with a water connection, involve the switching of valves and/or the removal and attachment of lines.

Disadvantages of the previously known solutions are their susceptibility to errors when descaling brewing devices or coffee machines. Valves can be switched incorrectly or lines can be incorrectly removed or attached. In addition, the descaling of these brewing devices often has to be carried out by a technician, since the process is too complex and error-prone for an operator, so that descaling these devices is associated with considerable costs.

Document US20140060338 A1 discloses a descaling system for a beverage machine, which is equipped with a bypass line in which a cartridge containing water-soluble descaling tablets is arranged. The connection to the bypass line is opened via a three-way valve so that water flows into the cartridge, descaling agent is released from the descaling tablets and the descaling solution is fed to the brewing device. When the three-way valve is closed, water remains in the bypass line and descaling agent can still be dissolved in this water. The longer the flow to the bypass line is interrupted, the higher the concentration of the dissolving descaling agent becomes. Therefore, the concentration of the descaling agent depends on the time that elapses between two descaling cycles. If the concentration is too low, descaling can be incomplete; if the concentration is too high, the components that come into contact with the too highly concentrated descaling agent solution can corrode.

In order to avoid this disadvantage, according to EP 3 501 351 A1, a cartridge containing a liquid care product can be used. The cartridge contains a check valve in the cartridge neck, which can be opened by means of an opening element of the coupling device at the end of the metering line. Thus, a special cartridge with a check valve is required for this solution, which is configured to match the opening element of the coupling device. A metering pump is also required to deliver the liquid care product, which pumps the liquid care product through the metering line into the water line of the beverage machine. Another variant, which requires the use of a special cartridge, is shown in DE 10 2011 081 010 A1.

There is therefore a need for an improved device for metering an additive to a fluid, for example for the descaling of devices for the preparation of hot beverages, by means of which the descaling can be carried out in a simple manner with a descaling agent of a predetermined concentration.

OBJECT OF THE INVENTION

It is the object of the invention to provide a device for metering an additive into a fluid, which is easy to operate, not susceptible to incorrect manipulation and by means of which the concentration of the descaling agent is predetermined. In particular, the device is suitable for use with a commercially available cartridge, the cartridge containing no delivery or metering agents for the additive.

SUMMARY OF THE INVENTION

When the term "for example" is used in the following description, this term refers to exemplary embodiments and/or variants, which is not necessarily to be construed as a more preferred application of the teachings of the invention. Similarly, the terms "preferably", "preferred" should be understood as referring to one example from a set of exemplary embodiments and/or variants, which should not necessarily be construed as a preferred application of the teachings of the invention. Accordingly, the terms "for example," "preferably," or "preferred" may refer to a plurality of exemplary embodiments and/or variants.

The following detailed description contains various exemplary embodiments of the device according to the invention. The description of any particular device is to be considered as exemplary only. In the specification and claims, the terms "include", "comprise", "have" are interpreted as "including but not limited to".

A device for metering an additive into a fluid contains a valve body, a fluid inlet and a fluid outlet, wherein a first channel system in the valve body extends between the fluid inlet and the fluid outlet and a second channel system extends in the valve body between the fluid inlet and the fluid outlet, such that in the operating state a fluid can either flow through the first channel system from the fluid inlet to the fluid outlet or can flow through the second channel system from the fluid inlet to the fluid outlet. The valve body contains a docking element, which is configured for docking a cartridge for an additive. A switchover device is provided, which can be switched if the cartridge is docked such that the second channel system is fluidically connected to the cartridge when the cartridge is connected to the docking element. The switchover device is actuated in particular by the docking of the cartridge on the valve body. The switchover device is movable between a first position, in which the fluid inlet is connected to the fluid outlet via the first channel system, and a second position, in which the fluid inlet is connected to the fluid outlet via the second channel system. By docking the cartridge on the valve body, the switchover device is moved from a first position to the second position. The connection between the fluid inlet and the fluid outlet via the first channel system is interrupted by means of the switchover device and at the same time the connection of the fluid inlet to the fluid outlet via the second channel system is opened by means of the switchover device. The switchover device contains in particular at least one slide element, by means of which the connection between the fluid inlet and the fluid outlet via the first channel system can be interrupted, wherein the connection between the fluid inlet and the fluid outlet via the second channel system is opened at the same time by means of the slide element. The fluid inlet can be configured in particular as a water inlet. The fluid outlet can be designed in particular as a water outlet.

According to an embodiment, the switchover device includes an inlet passage for supplying fluid to the cartridge and an outlet passage for removing fluid loaded with the additive from the cartridge.

In particular, the fluid inlet can be connected to the fluid outlet via an overflow passage if no addition of the additive is required. The overflow passage can be formed between a cover and the switchover device when the switchover device is in a first position. In particular, the overflow passage is closed when the switchover device is in a second position.

According to an embodiment, the switchover device comprises an inlet plunger and an outlet plunger and a separating element.

In particular, the inlet plunger can comprise a base body and a base element, wherein a shoulder is configured a transition between the base body and the base element. The outlet plunger can comprise a base body and a base element, wherein a shoulder is configured as a transition between the base body and the base element.

The base element of the inlet plunger can include an axial bore, wherein a first spring element is disposed in the axial bore. The base element of the outlet plunger can contain an axial bore, wherein a second spring element is disposed in the axial bore.

An inlet seal can be arranged on the shoulder of the inlet plunger. An outlet seal can be arranged on the shoulder of the outlet plunger.

According to an embodiment, the switchover device can be switched from a first position to a second position by docking the cartridge, wherein in the second position the inlet passage is open for supplying the fluid to the cartridge and the outlet passage is open for withdrawing the fluid loaded with the additive from the cartridge.

In particular, the switchover device can comprise a displacement body.

According to an embodiment, the docking element includes an internal thread which is configured to engage with an external thread on the cartridge neck.

According to an embodiment, the docking element is arranged in a recess of the valve body.

According to an embodiment, the valve body includes a seal which is arranged between the fluid inlet or the fluid outlet and the docking element.

In particular, the fluid can be water. In particular, the additive can be a descaling agent or contain a descaling agent. In particular, the additive can comprise a syrup. In particular, the additive can include a concentrate. The additive can also be an additional substance.

A method for metering an additive into a fluid comprises a device containing a valve body, a fluid inlet and a fluid outlet, wherein a first channel system in the valve body extends between the fluid inlet and the fluid outlet and a second channel system extends between the fluid inlet and the fluid outlet, such that a fluid can flow in the operating state either through the first channel system from the fluid inlet to the fluid outlet or through the second channel system from the fluid inlet to the fluid outlet. No additive is added to the fluid when the fluid is passed through the first channel system, wherein the additive is added to the fluid when the fluid is passed through the second channel system.

The method can be used, for example, for descaling a device for preparing a hot beverage. The method can be used for adding a syrup to a stream of soda water. The method can be used for metering a concentrate into a fluid. The method can be used for metering an additive to a fluid. The method is equally suitable for the addition of a plurality of additional substances or additives.

A hot beverage can comprise, for example, coffee, tea, milk, cocoa, or a soup. A hot beverage can also be understood to mean another liquid foodstuff that is heated, for example a soup. Such a liquid foodstuff is consumed in the manner of a beverage.

A device for preparing a hot beverage can in particular comprise an apparatus for producing an extract from an extraction material using an extractant. In particular, the extractant can be water. The apparatus can contain a supply line for the extractant, a device for descaling according to one of the preceding embodiments, a heating device, a brewing device, and an extract collection recipient. The brewing device contains the extraction material. The supply line is configured to supply the extractant to the heating device. A connecting line is provided for the heated extractant from the heating device to the brewing device. The brewing device contains a receiving element for extraction material, which is permeable to the extractant, so that an extract can be obtained through contact of the heated extractant with the extraction material. The extract collection recipient is configured to collect the extract. A flow meter for determining a volume flow measurement value of the extractant is arranged in the supply line. According to an embodiment, the supply line contains the device for descaling and, if necessary, a control valve.

The apparatus can contain a control unit, wherein the control unit comprises a computing unit, a comparison unit, and a memory unit. The memory unit contains a number of metering specifications, which contain the desired volume flows and the desired temperatures of the extractant for the preparation of the extract. One of the metering specifications can be selected by means of an input device, which includes the desired volume flow and the desired temperature of the heated extractant. In particular, a metering specification for starting up the device for descaling can be selected by means of the input device. The opening time of the control valve can be determined from the desired volume flow by the computing unit, wherein the volume flow measurement value is comparable to the desired volume flow by the comparison unit, so that the control valve can be adjusted in such a way that the desired volume flow corresponds to the volume flow measurement value.

The device described above can be used for an apparatus for preparing a wide variety of hot beverages such as coffee, tea and soups. The hot beverage can be rained and brewed or extracted under pressure.

BRIEF DESCRIPTION OF THE DRAWINGS

The device according to the invention is illustrated below according to some exemplary embodiments. It is shown in FIG. 1 a device according to a first embodiment with a cartridge in a first position, FIG. 2 the device of FIG. 1 with the cartridge in a second position, FIG. 3 a section through the device of FIG. 2, FIG. 4 a device according to a second embodiment in a plan view, FIG. 5 a longitudinal section through the device of FIG. 4 with a cartridge in the second position, FIG. 6 a section through the device of FIG. 4, FIG. 7 a longitudinal section through the device according to a third embodiment in a first position, FIG. 8 a longitudinal section through the device according to the third embodiment in a second position, FIG. 9 an embodiment for the use of the device according to one of the preceding embodiments for a device for the preparation of a hot beverage.

DETAILED DESCRIPTION

Figure 1:
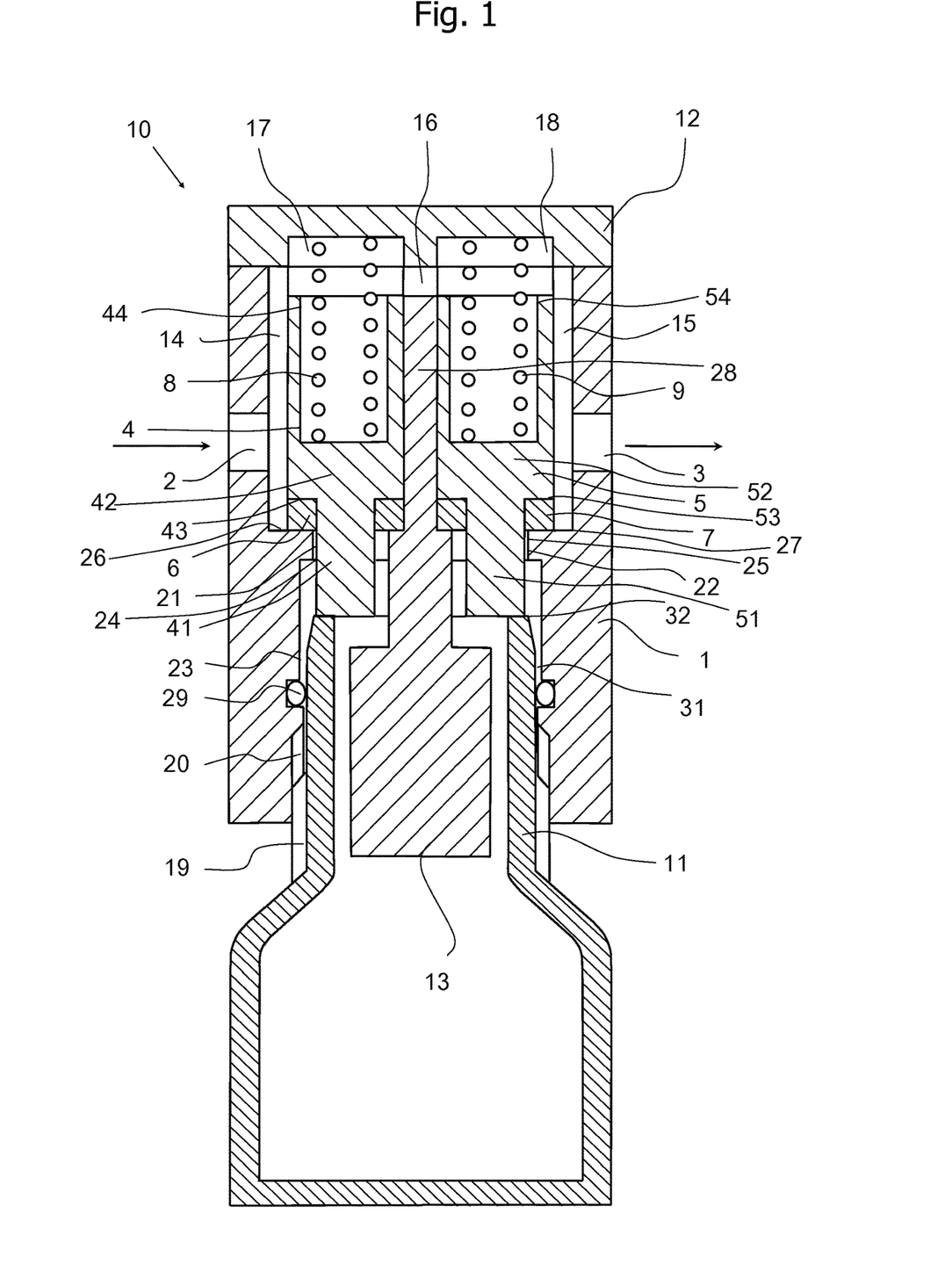

FIG. 1 shows a device 10 for metering an additive into a fluid, for example a descaling agent to a stream of water for descaling of a device for preparing a hot beverage, according to a first exemplary embodiment of the invention. According to this embodiment, the device is installed in a fluid line belonging to the device.

For this purpose, a fluid inlet 2 (shown schematically) and a fluid outlet 3 are provided. Both the fluid inlet 2 and the fluid outlet 3 can have adapter elements (not shown) for connection to a fluid line. The device 10 contains a first channel system, which extends between the fluid inlet 2 and the fluid outlet 3, and a second channel system, which extends between the fluid inlet 2 and the fluid outlet 3, so that fluid can either flow through the first channel system from the fluid inlet 2 to the fluid outlet 3 or can flow through the second channel system from the fluid inlet 2 to the fluid outlet 3. The valve body 1 contains a docking element 20 which is configured for docking a cartridge 11 for an additive. A switchover device 4, 5, 28 is provided, which can be switched if the cartridge 11 is docked such that the second channel system is in fluidically connected to the cartridge 11 when the cartridge 11 is connected to the docking element 20. The switchover device 4, 5, 28 contains an inlet passage 21 for supplying fluid to the cartridge and an outlet passage 22 for removing fluid loaded with additive from the cartridge 11.

In particular, the fluid inlet 2 is connected to the fluid outlet 3 via an overflow passage 14, 15 if no addition of the additive is required. The overflow passage is formed between a cover 12 and the switchover device 4, 5, 28 when the switchover device is in the first position. According to FIG. 1, the switchover device comprises an inlet plunger 4 and an outlet plunger 5 and a separating element 28. The inlet plunger 4 comprises a base body 41 and a base element 42. A shoulder 43 forms a transition between the base body 41 and the base element 42. An inlet seal 6 is arranged on the shoulder 43. The base element 42 contains an axial bore 44. A first spring element 8 is arranged in the axial bore 44.

The outlet plunger 5 comprises a base body 51 and a base element 52. A shoulder 53 forms a transition between the base body 51 and the base element 52. An outlet seal 7 is arranged on the shoulder 53. The base element 52 contains an axial bore 54. A second spring element 9 is arranged in the axial bore 54.

According to FIG. 1 the first channel system is formed by a first overflow passage 14, a connecting passage 16 and a second overflow passage 15. The connecting passage 16 connects the first overflow passage 14 to the second overflow passage 15. The inlet plunger 4 is slidably mounted in a bore in the valve body 1 of the device 10.

The inlet plunger 4 thus includes the inlet seal 6 and the first spring element 8. The inlet seal 6 is used to close an inlet opening for a descaling agent. The inlet opening is closed when no additive is to be added to the fluid flowing through the first channel system.

The first spring element 8 is at least partially accommodated in the axial bore 44 of the inlet plunger 4, which is configured as a blind hole in this embodiment. The first spring element 8 is supported on the bottom of the blind hole and on the cover 12 of the valve body 1. The cover 12 is required to enable the installation of the inlet plunger 4 and the outlet plunger 5 in the corresponding bore in the valve body 1. According to the present embodiment, the axial bores 44, 54 for the inlet plunger 4 and the outlet plunger 5 are arranged next to one another and have central axes running parallel to one another.

The outlet plunger 5 contains the outlet seal 7 and the second spring element 9. The outlet seal 7 serves to close an outlet opening 25 for an additive. The outlet opening 25 is closed when no additive is to be added to the fluid stream flowing through the first channel system. The second spring element 9 is at least partially accommodated in the axial bore 54 of the outlet plunger 5, which is configured as a blind hole according to this embodiment. The second spring element 9 is supported on the bottom of the blind hole and on the cover 12 of the valve body 1.

The valve body 1 also includes a recess 23 configured to receive a cartridge 11 therein. The cartridge 11 is a container that can contain an additive to be added to the fluid on demand. The cartridge 11 contains a cartridge neck 31 which, according to this embodiment, is equipped with an external thread 19.

The second channel system is formed by an inlet passage 21, the interior of the cartridge 11 and an outlet passage 22. The inlet passage 21 connects to the fluid inlet 2. The outlet passage 22 leads to the fluid outlet 3. The second channel system is only open to the fluid flow when the cartridge 11 is accommodated in the valve body 1.

In this embodiment, the external thread 19 located on the cartridge neck 31 is screwed into the internal thread of the docking element 20 for this purpose. According to the present embodiment, the valve body 1 has a recess 23 on its side opposite the cover 12, which recess is configured to receive at least the cartridge neck 31 of the cartridge 11. The recess 23 has a docking element 20 with an internal thread, which receives the external thread 19 of the cartridge neck 31 when the cartridge 11 is connected to the valve body 1.

The switchover device 4, 5 is switched from a first position to a second position by the docking of the cartridge 11, wherein in the second position the inlet passage 21 is open for supplying fluid to the cartridge 11 and the outlet passage 22 for removing fluid loaded with additive from the cartridge 11. According to this embodiment, the end 32 of the cartridge neck 31 rests on a base body 41 of the inlet plunger 4 and on a base body 51 of the outlet plunger 5, while the cartridge neck 31 is screwed into the internal thread of the docking element 20 of the valve body 1 located in the recess 23.

Figure 2:
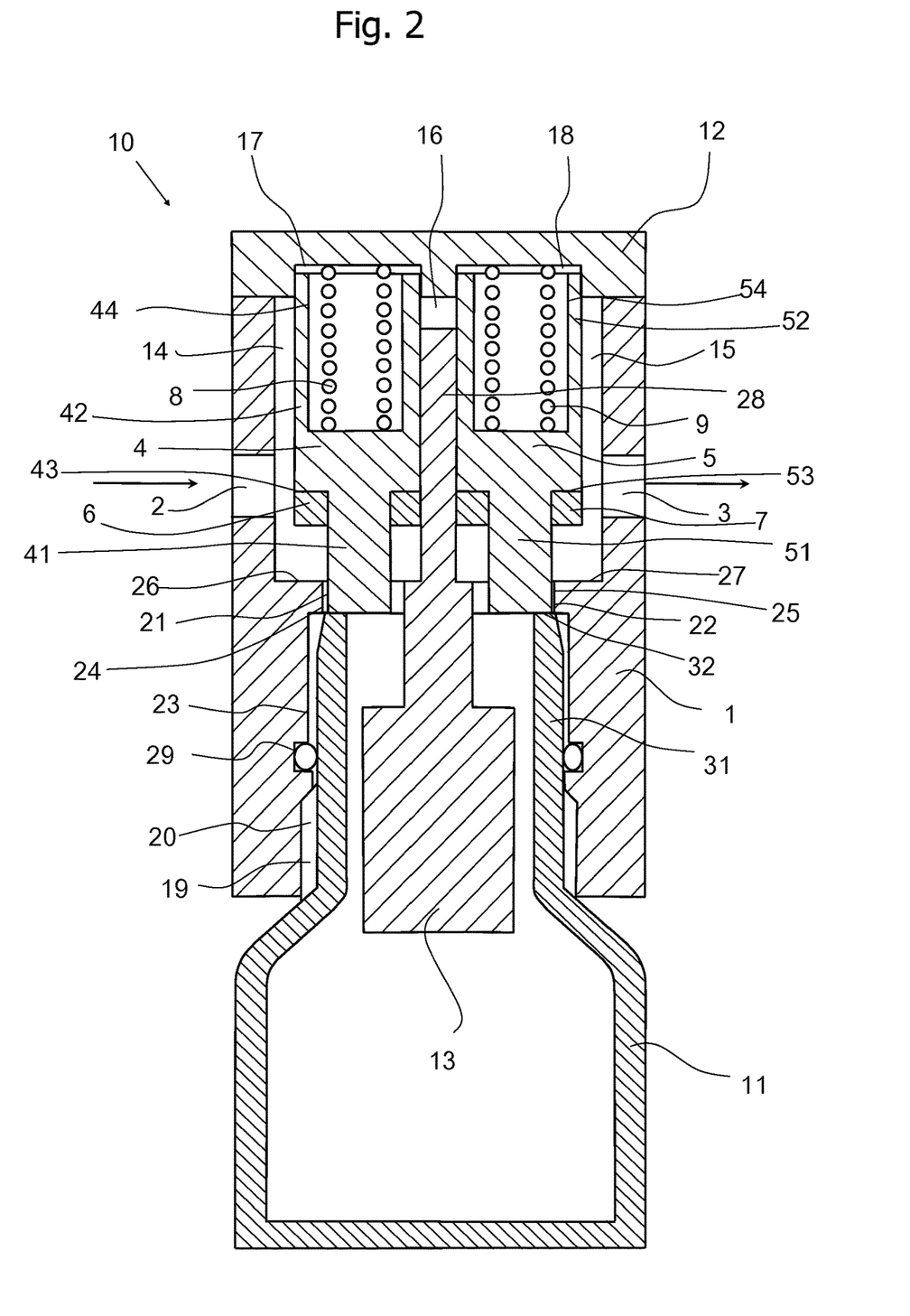

FIG. 2 shows the device 10 with the cartridge 11 in a second position, for example in the descaling position. In the second position, the first channel system is closed for the flow of fluid, the second channel system is open. When the external thread 19 on the cartridge neck 31 of the cartridge 11 is screwed into the internal thread of the docking element 20 of the recess 23, the base bodies 41, 51 are displaced in the direction of the cover 12. The first and second spring elements 8, 9 are compressed. The inlet seal 6 and the outlet seal 7 are lifted from their seat 26, 27 in the valve body 1, so that the inlet passage 21 and the outlet passage 22 are opened. Fluid can now flow into the cartridge 11 through the inlet passage 21. The fluid absorbs the additive located inside the cartridge 11 and leaves the cartridge 11 through the outlet passage 22, which leads to the fluid outlet 3, as a fluid stream loaded with the additive.

The first channel system is closed by the displacement of the inlet plunger 4 and the outlet plunger 5. Although the fluid can continue to enter the first overflow passage 14, the end area of the inlet plunger 4 is pushed into a corresponding first closure cavity 17 in the cover 12, as a result of which the connecting passage 16 is closed. The fluid can now not get into the connecting passage 16. The end area of the outlet plunger 5 is also pushed into a corresponding second closure cavity 18 in the cover 12, as a result of which the connection from the connecting passage 16 to the second overflow passage 15 is interrupted. The fluid loaded with the additive leaves the device 10 via the fluid outlet 3.

The base body 41 is accommodated in an inlet opening 24 of the valve body 1. The inlet opening 24 is part of the inlet passage 21. The inner diameter of the inlet opening 24 is larger than the outer diameter of the base body 41, so that fluid can flow between the base body and the inner wall of the valve body 1 formed by the inlet opening 24.

The base body 51 is accommodated in an outlet opening 25 of the valve body 1. The outlet opening 25 is part of the outlet passage 22. The inner diameter of the outlet opening is larger than the outer diameter of the base body 51, so that fluid can flow between the base body and the inner wall of the valve body 1 formed by the outlet opening 25.

The cartridge neck 31 of the cartridge 11 has a smaller outside diameter than the inside diameter of the recess 23. Fluid can therefore flow both outside the cartridge neck 31 and inside the cartridge neck 31. In order to prevent leakage, a seal 29 is therefore arranged in the recess 23, which prevents fluid from reaching the docking element 20 and from there reaching the environment.

Figure 3:
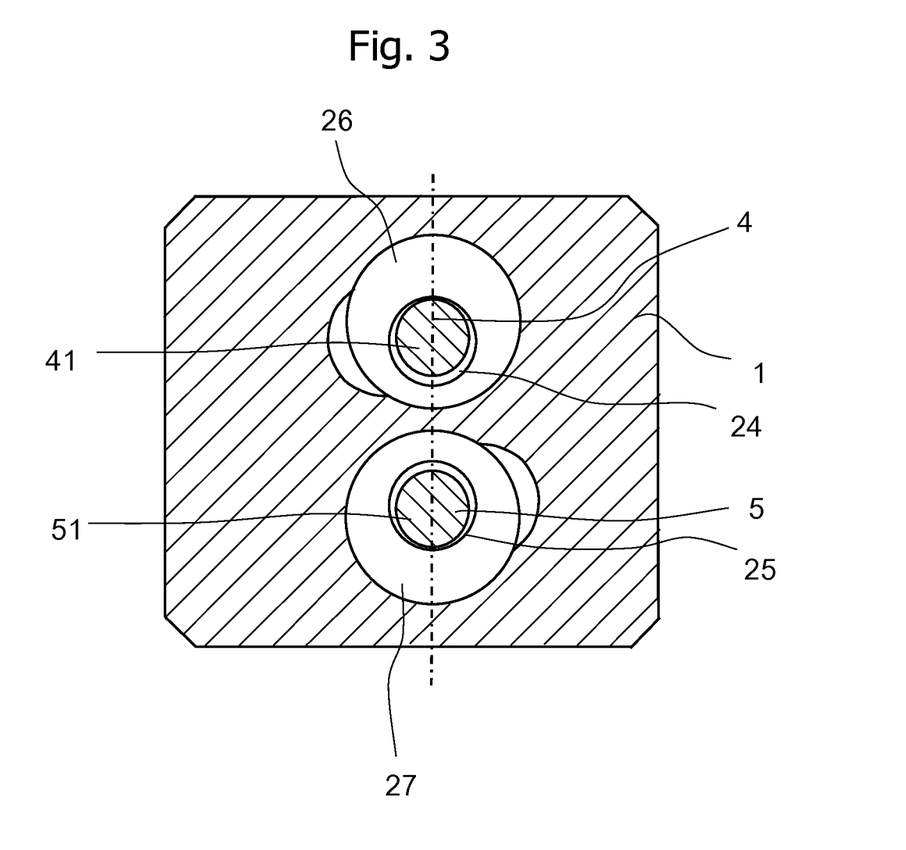

FIG. 3 shows a section through the device 10 according to FIG. 2 at the sectional plane marked with a dashed line and two arrows, which in FIG. 2 runs at right angles to the plane of the drawing. The viewing direction is in the direction of the cartridge 11. The section shows the valve body 1, the inlet passage 21, the outlet passage 22, the base body 41 of the inlet plunger 4, the base body 51 of the outlet plunger 5, the inlet opening 24 and the outlet opening 25. According to this embodiment, the two base bodies 41, 51 are not concentric the corresponding inlet opening 24 and the outlet opening 25 so that the main volume flow of the fluid is conducted into the cartridge 11 and only a small portion of the fluid can enter the space between the cartridge neck 31 and the recess 23.

FIG. 3 also shows the shoulder 26 which forms the seat for the inlet seal 6 (see FIG. 1) and the shoulder 27 which forms the seat for the outlet seal 7 when the device is in the position shown in FIG. 1. Since the outer diameter of the base bodies 41, 51 is significantly smaller than the inner diameter of the bores intended for receiving the inlet plunger 4 and the outlet plunger 5, the fluid can flow around the base bodies 41, 51 and flow from the fluid inlet 2 into the cartridge 11 and thereafter flow from the cartridge 11 to the fluid outlet 3.

FIG. 1 and FIG. 2 also show a displacement body 13 which is located in the interior of the cartridge neck 31 when the cartridge is inserted into the recess 23 of the valve body 1. The displacement body 13 can be part of the valve body 1 or can be connected to the valve body 1 via the separating element 28 extending between the inlet plunger 4 and the outlet plunger 5. The connection between the displacement body 13 and the separating element 28 can be configured as a screw connection, a plug connection or a snap connection. The connection options are known per se to a person skilled in the art and are therefore not described further at this point.

The displacement body 13 serves to introduce the fluid into the additive. The displacement body 13 can be used to ensure that the fluid flow coming from the inlet passage 21 is guided through the additive and absorbs it on its way through the cartridge 11. Without the displacement body 13, a partial fluid flow can be formed, which would form a bypass to the additive and therefore no or too little additive would be absorbed by the fluid flow on the flow path through the cartridge 11.

The displacement body 13 also has the advantage that no additive or fluid can get into the environment during assembly or disassembly of the cartridge 11. When the cartridge is docked to the switchover device 4, 5, the displacement body is located in the interior of the cartridge neck 31. The cartridge is usually not completely filled. This means that a maximum of 80% of the volume of the cartridge 11 is filled with the additive. If the cartridge 11 cannot be installed in a vertical position but in an inclined position, the displacement body 13 ensures that no additive can leak out.

If the cartridge 11 is disassembled because the additive has been used up, the displacement body 13 finds another advantageous use. The cartridge 11 is completely filled with fluid during disassembly. If the cartridge 11 is removed, the fluid could spill, particularly if the cartridge 11 is not in a vertical position. However, a portion of the fluid is displaced by the displacement body 13. If the cartridge 11 is disassembled, any fluid that was present in the inlet passage 21 or the outlet passage 22 or in the cartridge neck 31 can flow into the space released by the displacement body 13, so that the cartridge 11 is no longer completely filled with fluid and can therefore be removed, without any fluid leaking out and getting into the environment.

Figures 4, 5, 6:
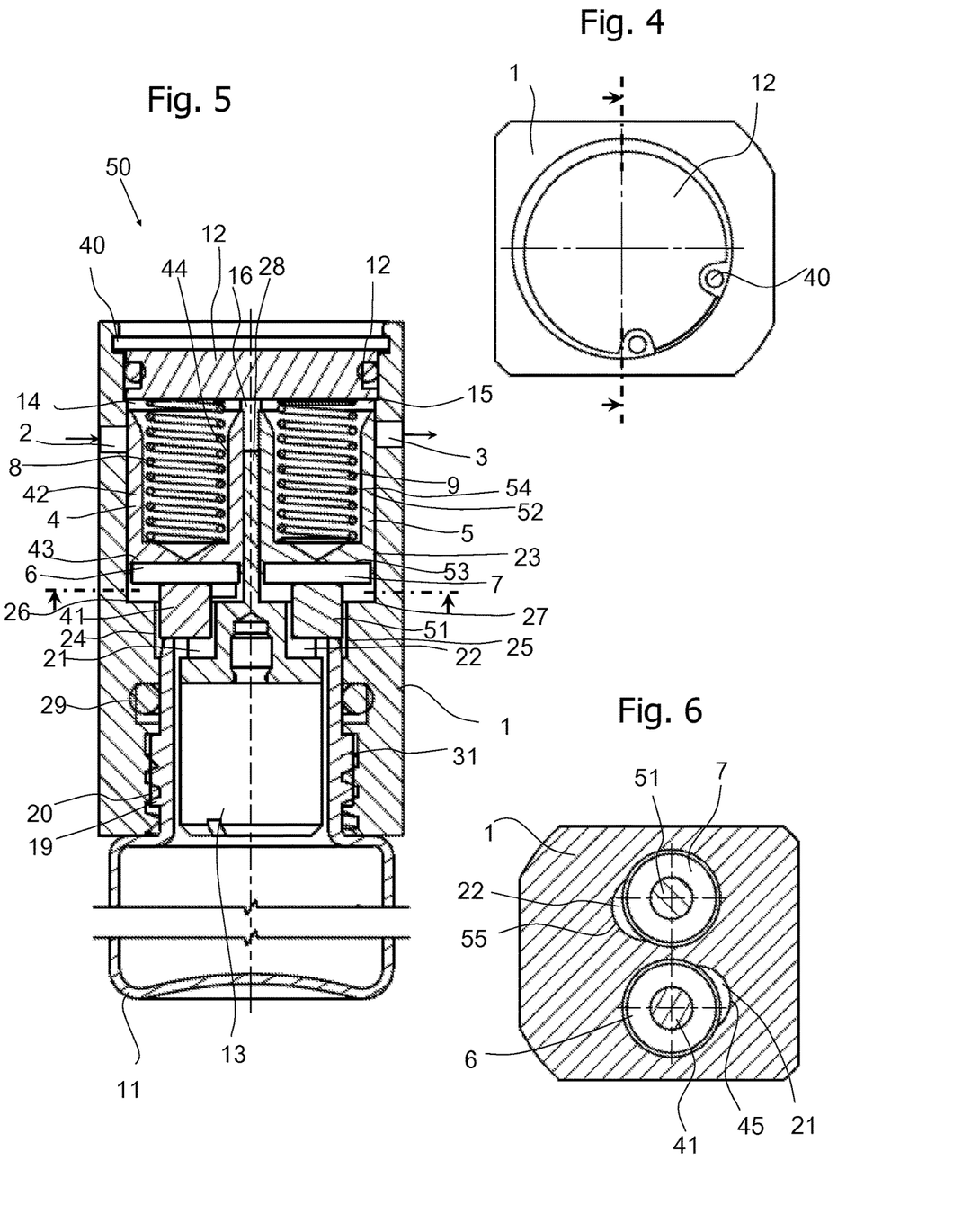

FIG. 4 shows a device 50 according to a second embodiment in a plan view, wherein the same reference numerals are used for elements of this embodiment which are the same or have the same effect as in the previous embodiment. FIG. 4 shows the valve body 1 and a cover 12 inserted into the valve body 1. The second embodiment differs from the first embodiment, inter alia, in that the cover 12 is not placed on the valve body 1 but is inserted into the valve body 1. The cover 12 is held in position by a locking ring 40.

FIG. 5 shows a longitudinal section through the device 50 according to FIG. 4 with a cartridge 11 in the second position, i.e., the docking position, according to which the fluid flows through the cartridge 11 in order to absorb the additive located therein. The device 50 can also be used, for example, to descale a device for preparing a hot beverage. The device 50 is attached, for example, in a fluid line belonging to the device. However, the device 50 can be installed in any fluid line. The device 50 contains a fluid inlet 2, shown schematically, and a fluid outlet 3. Both the fluid inlet 2 and the fluid outlet 3 can have adapter elements (not shown) for connection to a fluid line. The device 50 contains a first channel system, which extends between the fluid inlet 2 and the fluid outlet 3, and a second channel system, which extends between the fluid inlet 2 and the fluid outlet 3, so that fluid can either flow through the first channel system from the fluid inlet 2 to the fluid outlet 3 or can flow through the second channel system from the fluid inlet 2 to the fluid outlet 3. The valve body 1 contains a docking element 20 which is configured for docking a cartridge 11 for an additive. A switchover device 4, 5, 28 is provided, which can be switched when the cartridge 11 is docked in such a way that the second channel system is in fluidically connected to the cartridge 11 when the cartridge 11 is connected to the docking element 20. The switchover device contains an inlet passage 21 for supplying fluid to the cartridge and an outlet passage 22 for removing fluid loaded with the additive from the cartridge 11.

In particular, the fluid inlet 2 is connected to the fluid outlet 3 via an overflow passage 14, 15 when no addition of the additive is required. The overflow passage is formed between a cover 12 and the switchover device 4, 5, 28 when the switchover device is in the first position. The switchover device according to FIG. 5 comprises an inlet plunger 4 and an outlet plunger 5 and a separating element 28. The inlet plunger 4 comprises a base body 41 and a base element 42. A shoulder 43 forms a transition between the base body 41 and the base element 42. An inlet seal 6 is arranged on the shoulder 43. The base element 42 contains an axial bore 44. A first spring element 8 is arranged in the axial bore 44.

The outlet plunger 5 comprises a base body 51 and a base element 52. A shoulder 53 forms a transition between the base body 51 and the base element 52. An outlet seal 7 is arranged on the shoulder 53. The base element 52 contains an axial bore 54. A second spring element 9 is arranged in the axial bore 54.

According to FIG. 5 the first channel system is formed by a first overflow passage 14, a connecting passage 16 and a second overflow passage 15. The connecting passage 16 connects the first overflow passage 14 to the second overflow passage 15 when the switchover element is in the first position, which is not shown. The inlet plunger 4 is arranged in the first overflow passage 14, and the outlet plunger 5 is arranged in the second overflow passage 15. The inlet plunger 4 is slidably mounted in a recess 23 in the valve body 1 of the device 50.

The inlet plunger 4 thus includes the inlet seal 6 and the first spring element 8. The inlet seal 6 serves to close an inlet opening 24 for an additive. The inlet opening 24 is closed when no additive is to be added to the fluid flowing through the first channel system, which is not shown in FIG. 5.

The first spring element 8 is at least partially accommodated in the axial bore 44 of the inlet plunger 4, which is configured as a blind hole in this embodiment. The first spring element 8 is supported on the bottom of the blind hole and on the cover 12 of the valve body 1. The cover 12 is required to enable the installation of the inlet plunger 4 and the outlet plunger 5 in the corresponding bore in the valve body 1. According to the present embodiment, the axial bores 44, 54 for the inlet plunger 4 and the outlet plunger 5 are arranged next to one another and have central axes running parallel to one another.

The outlet plunger 5 contains the outlet seal 7 and the second spring element 9. The outlet seal 7 serves to close an outlet opening 25 for an additive. The outlet opening 25 is closed when no additive is to be added to the fluid flow flowing through the first channel system, which is not shown in FIG. 5. The second spring element 9 is at least partially accommodated in the axial bore 54 of the outlet plunger 5, which is designed as a blind hole according to this exemplary embodiment. The second spring element 9 is supported on the bottom of the blind hole and on the cover 12 of the valve body 1.

The valve body 1 also includes a recess 23 adapted to receive a cartridge 11 therein. The cartridge 11 is a container that can contain an additive that can be added to the fluid on demand. The cartridge 11 contains a cartridge neck 31 which, according to this embodiment, is equipped with an external thread 19.

The second channel system is formed by an inlet passage 21, the interior of the cartridge 11 and an outlet passage 22. The inlet passage 21 connects to the fluid inlet 2. The outlet passage 22 leads to the fluid outlet 3. The second channel system is only open to the flow of fluid when the cartridge 11 is accommodated in the valve body 1, as shown in FIG. 5.

In this embodiment, the external thread 19 located on the cartridge neck 31 is screwed into the internal thread of the docking element 20 for this purpose. According to the present embodiment, the valve body 1 has a recess 23 on its side opposite the cover 12, which recess is configured to receive at least the cartridge neck 31 of the cartridge 11. According to this embodiment, this recess 23 also contains the inlet plunger 4 and the outlet plunger 5.

The recess 23 has a docking element with an internal thread 20 which receives the external thread 19 of the cartridge neck 31 when the cartridge 11 is connected to the valve body 1, as shown in FIG. 5.

The switchover device 4, 5 is switched from a first position to a second position by the docking of the cartridge 11, wherein in the second position, the inlet passage 21 for supplying fluid to the cartridge 11 and the outlet passage 22 for removing fluid loaded with additive from the cartridge 11 is open. According to this embodiment, the end 32 of the cartridge neck 31 rests on a base body 41 of the inlet plunger 4 and on a base body 51 of the outlet plunger 5 before the cartridge neck 31 is screwed into the internal thread 20 of the valve body 1 located in the recess 23.

FIG. 5 thus shows the device 50 with the cartridge 11 in a second position, for example in the descaling position. In the second position, the first channel system is closed for the flow of fluid, the second channel system is open. When the external thread 19 on the cartridge neck 31 of the cartridge 11 is screwed into the internal thread of the docking element 20 of the recess 23, the base bodies 41, 51 are displaced in the direction of the cover 12. The first and second spring elements 8, 9 are compressed. The inlet seal 6 and the outlet seal 7 are lifted from their seat 26, 27 in the valve body 1, so that the inlet passage 21 and the outlet passage 22 are opened. Fluid can now flow into the cartridge 11 through the inlet passage 21. The fluid absorbs the additive located inside the cartridge 11 and leaves the cartridge 11 through the outlet passage 22, which leads to the fluid outlet 3, as a fluid stream loaded with the additive. For this purpose, the crescent-shaped protrusions 45, 55 are provided, which are shown in section in FIG. 6.

The first channel system is closed by the displacement of the inlet plunger 4 and the outlet plunger 5. According to this embodiment, the fluid cannot enter the first overflow passage 14 since this is closed by the inlet plunger 4. The outlet plunger 5 also closes the connection to the second overflow passage 15. The fluid loaded with additive leaves the device 50 via the fluid outlet 3.

The base body 41 is accommodated in an inlet opening 24 of the valve body 1. The inlet opening 24 is part of the inlet passage 21. The inner diameter of the inlet opening 24 is larger than the outer diameter of the base body 41, so that fluid can flow between the base body and the inner wall of the valve body 1 formed by the inlet opening 24.

The base body 51 is accommodated in an outlet opening 25 of the valve body 1. The outlet opening 25 is part of the outlet passage 22. The inner diameter of the outlet opening is larger than the outer diameter of the base body 51, so that fluid can flow between the base body and the inner wall of the valve body 1 formed by the outlet opening 25.

The cartridge neck 31 of the cartridge 11 has a smaller outside diameter than the inside diameter of the recess 23 at least in the region that is not occupied by the docking element 20. Fluid can therefore flow both outside the cartridge neck 31 and inside the cartridge neck 31. In order to prevent leakage, a seal 29 is therefore arranged in the recess 23, which prevents fluid from reaching the docking element 20 and from there being able to reach the environment.

FIG. 5 also shows the shoulder 26 which forms the seat for the inlet seal 6 (see FIG. 1) and the shoulder 27 which forms the seat for the outlet seal 7 when the device is in the position shown in FIG. 1. Since the outer diameter of the base body 41, 51 is also according to FIG. 5 significantly smaller than the inner diameter of the bores, which are intended to accommodate the inlet plunger 4 and the outlet plunger 5, the fluid can flow around the base body 41, 51 and flow from the fluid inlet 2 into the cartridge 11 and then flow from the cartridge 11 to the fluid outlet 3.

FIG. 5 also shows a displacement body 13 which is located in the interior of the cartridge neck 31 when the cartridge is inserted into the recess 23 of the valve body 1. According to this embodiment, the displacement body 13 is connected to the separating element 28 extending between the inlet plunger 4 and the outlet plunger 5. The connection between the displacement body 13 and the separating element 28 can be configured as a screw connection, a plug connection or a snap connection. The connection options are known per se to a person skilled in the art and are therefore not described further at this point.

The displacement body 13 serves to introduce the fluid into the additive. The displacement body 13 can be used to ensure that the fluid flow coming from the inlet passage 21 is directed onto or through the additive and absorbs it on its way through the cartridge 11. Without the displacement body 13, a partial fluid flow can be formed, which would form a bypass to the additive and therefore no or too little additive would be absorbed by the fluid flow on the flow path through the cartridge 11.

The displacement body 13 also has the advantage that no additive or fluid can get into the environment during assembly or disassembly of the cartridge 11. When the cartridge is docked to the switchover device 4, 5, the displacement body is located in the interior of the cartridge neck 31. The cartridge is usually not completely filled. This means that a maximum of 80% of the volume of the cartridge 11 is filled with the additive. If the cartridge 11 cannot be installed in a vertical position but in an inclined position, the displacement body 13 ensures that no additive can leak out.

If the cartridge 11 is disassembled because the additive has been used up, the displacement body 13 finds another advantageous use. The cartridge 11 is completely filled with fluid during disassembly. If the cartridge 11 is removed, the fluid could spill, particularly if the cartridge 11 is not in a vertical position. However, part of the fluid is displaced by the displacement body 13. If the cartridge 11 is disassembled, fluid that was present in the inlet passage 21 or outlet passage 22 or in the cartridge neck 31 can flow into the space released by the displacement body 13, so that the cartridge 11 is no longer completely filled with fluid and can therefore be removed, without fluid leaking and getting into the environment.

FIG. 6 shows a section through the device 50 according to FIG. 5 with the sectional plane marked with a dashed line and two arrows, which in FIG. 5 runs at right angles to the plane of the drawing. The viewing direction is chosen to correspond to the direction of the cover 12. The section shows the valve body 1, the inlet passage 21, the outlet passage 22, the base body 41 of the inlet plunger 4, the base body 51 of the outlet plunger 5. According to this embodiment, the two base bodies 41, 51 are arranged concentrically in the corresponding recess 23 for the inlet plunger 4 and the outlet plunger 5, so a protrusion 45 is provided which forms the connection between the fluid inlet 3 and the inlet opening 24 lying in front of the plane of the drawing. A corresponding protrusion 55 is provided, which forms the connection between the outlet opening 25 (not visible here) and the fluid outlet 3.

Figure 7:
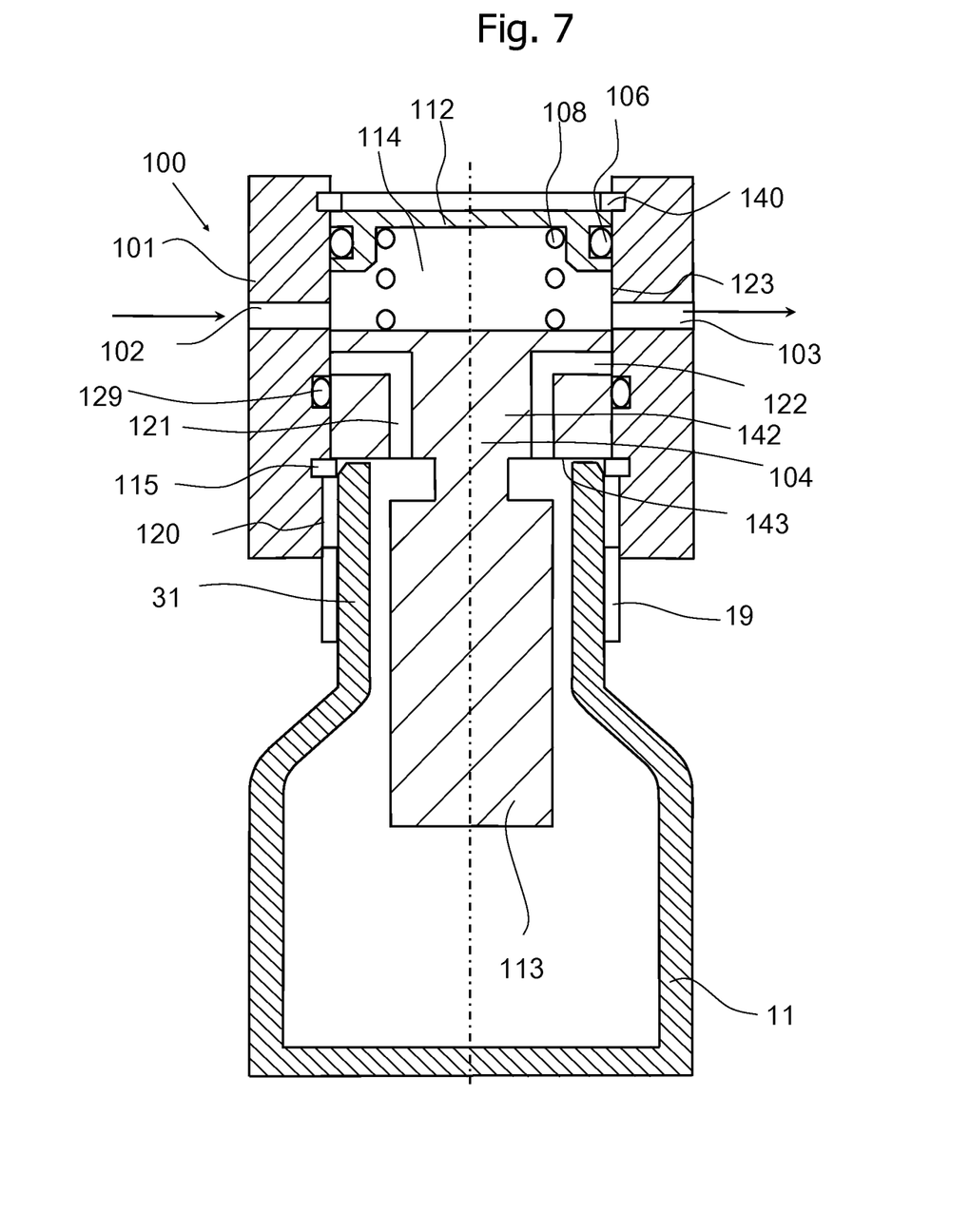

FIG. 7 shows a longitudinal section through a device 100 according to a third embodiment in the first position. The device 100 can be used to descale a device for preparing a hot beverage. The device 100 can be mounted in a fluid line associated with the device. The device 100 can also be arranged in any fluid line which contains a fluid to which an additive must be added. For this purpose, a fluid inlet 102 (shown schematically) and a fluid outlet 103 are provided. Both the fluid inlet 102 and the fluid outlet 103 can have adapter elements (not shown) for connection to a fluid line. The device 100 contains a first channel system, which extends between the fluid inlet 102 and the fluid outlet 103, and a second channel system, which extends between the fluid inlet 102 and the fluid outlet 103, so that fluid can either flow through the first channel system from the fluid inlet 102 to the fluid outlet 103 or can flow through the second channel system from the fluid inlet 102 to the fluid outlet 103. The valve body 101 contains a docking element 120 which is configured for docking a cartridge 11 for an additive. A switchover device 104 is provided, which can be switched when the cartridge 11 is docked in such a way that the second channel system is fluidically connected to the cartridge 11 when the cartridge 11 is connected to the docking element 120. The switchover device 104 contains an inlet passage 121 for supplying fluid to the cartridge and an outlet passage 122 for removing fluid loaded with additive from the cartridge 11.

In particular, the fluid inlet 102 is connected to the fluid outlet 103 via an overflow passage 114 when no addition of additive is required. The overflow passage 114 is formed between a cover 112 and the switchover device 104 when the switchover device 104 is in the first position. According to FIG. 7, the switchover device 104 comprises a base element 142 and a displacement body 113. A shoulder 143 forms a transition between the base element 142 and the displacement body 113. A spring element 108 is arranged between the base element 142 and the cover 112.

According to FIG. 7, the first channel system is formed by an overflow passage 114. In the first position, the base element 142 is located below the fluid inlet 102 and the fluid outlet 103, so that an unimpeded flow through the valve body 101 through the overflow passage 114 is possible. The inlet opening is closed when no additive is to be added to the fluid stream flowing through the first channel system.

The spring element 108 is supported on the base element 142 and on the cover 112 of the valve body 101. The cover 112 is required in order to enable the switchover device 104 to be installed in the corresponding recess 123 in the valve body 101.

The recess 123 of the valve body 101 also serves to accommodate a cartridge 11, which can be designed as in the previous embodiments and is therefore provided with the same reference numbers. The cartridge 11 is a container that can contain an additive that can be added to the fluid stream on demand. The cartridge 11 contains a cartridge neck 31 which, according to this embodiment, is equipped with an external thread 19.

The second channel system is formed by an inlet passage 121, the interior of the cartridge 11 and an outlet passage 122. The inlet passage 121 connects to the fluid inlet 102 when the switchover device 104 is in the second position. The outlet passage 122 leads to the fluid outlet 103. The second channel system is only open to the flow of fluid when the cartridge 11 is accommodated in the valve body 101 in the docking element 120.

In this embodiment, the external thread 19 located on the cartridge neck 31 is screwed into the internal thread of the docking element 120 for this purpose. According to the present embodiment, the valve body 101 has a recess 123 which is configured to receive at least the cartridge neck 31 of the cartridge 11. The recess 123 contains the docking element 120.

The switchover device 104 is switched from a first position to a second position by the docking of the cartridge 11, wherein the inlet passage 121 for supplying fluid to the cartridge 11 and the outlet passage 122 for removing fluid loaded with additive from the cartridge 11 is open in the second position. According to this embodiment, the end 32 of the cartridge neck 31 rests on the base element 142 of the switchover device 104 when the cartridge 11 is screwed into the internal thread of the docking element 120 of the valve body 101 located in the recess 123.

Figure 8:
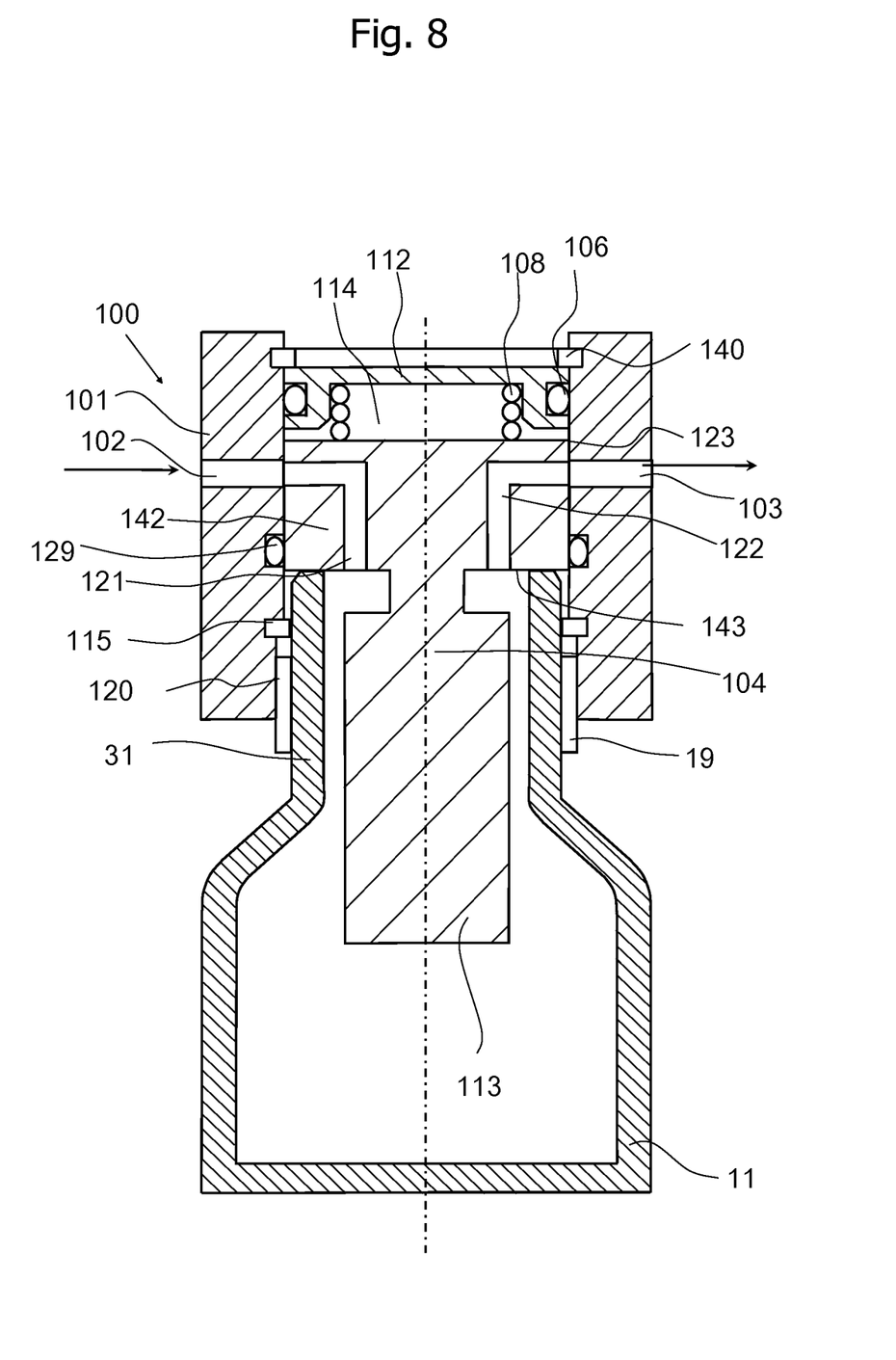

FIG. 8 shows the device 100 with the cartridge 11 in a second position, for example in the descaling position. In the second position, the first channel system is closed for the flow of fluid, the second channel system is open. When the external thread 19 on the cartridge neck 31 of the cartridge 11 is screwed into the internal thread of the docking element 120 of the recess 123, the switchover device 104 is displaced in the direction of the cover 112. The spring element 108 arranged in between is compressed. The inlet passage 121 and the outlet passage 122 are opened when the inlet opening overlays the corresponding outlet opening of the fluid inlet 102 and the outlet opening of the outlet passage 122 overlays the inlet opening of the fluid outlet 103. Fluid can now flow into the cartridge 11 through the inlet passage 121. The fluid absorbs the additive located inside the cartridge 11 and leaves the cartridge 11 through the outlet passage 122, which leads to the fluid outlet 103, as a fluid stream loaded with the additive.

The first channel system is closed by the displacement of the switchover device 104. The fluid can no longer enter the overflow passage 114 since the inlet is blocked by the outer wall of the switchover device 104. The fluid loaded with additive leaves the device 100 via the fluid outlet 103.

The switchover device 104 is held in the recess 123 of the valve body 101 by means of an anti-twist device (not shown) to ensure that the fluid inlet 102 is aligned with the inlet passage 121 in the second position and the fluid outlet 103 is aligned with the outlet passage 122.

The cartridge neck 31 of the cartridge 11 has a smaller outer diameter than the inner diameter of the recess 23. In this embodiment, fluid cannot flow outside the cartridge neck 31 since the end of the cartridge neck rests on the shoulder 143 of the base element 142 of the switchover device 104. In order to prevent any leakage, a non-illustrated sealing element can be arranged on the shoulder 143, wherein the sealing element can contain an elastic material.

According to this embodiment, the valve body 101 contains a seal 129 which is arranged between the fluid inlet 102 or the fluid outlet 103 and the docking element 120. Any leakage between the switchover device 104 and the valve body 101 can be prevented with this seal 129. The cover 112 also contains a seal 106 which prevents the occurrence of any leakage between the cover 112 and the valve body 101. The cover 112 is secured by means of a securing means, for example a securing ring 140, so that it remains in its position even if the increased pressure caused by the compression of the spring element 108 acts on the cover 112 in the second position.

The switchover device 104 is also secured by a securing means 115 when the device is in the first position. The securing means 115 can comprise a securing ring, for example.

A displacement body 113 is also shown in FIGS. 7 and 8, which is located in the interior of the cartridge neck 31 when the cartridge is inserted into the recess 123 of the valve body 101. According to this embodiment, the displacement body 113 is part of the switchover device 104. According to this embodiment, the displacement body 113 and the base element 142 are manufactured from a single piece. The connection between the displacement body 113 and the base element 142 can also be configured as a screw connection, plug connection or snap connection. The connection options are known per se to a person skilled in the art and are therefore not described further at this point. The displacement body 113 serves to introduce the fluid into the additive. The displacement body 113 can be used to ensure that the fluid flow coming from the inlet passage 21 is directed onto or through the additive and absorbs it on its way through the cartridge 11. Without the displacement body 113, a partial fluid flow can be formed, which would form a bypass to the additive and therefore no or too little additive would be absorbed by the fluid flow on the flow path through the cartridge 11.

The displacement body 113 also has the advantage that no additive or fluid can leak into the environment during assembly or disassembly of the cartridge 11. When the cartridge is docked to the switchover device 104, the displacement body 113 is located in the interior of the cartridge neck 31. The cartridge 11 is usually not completely filled. This means that a maximum of 80% of the volume of the cartridge is filled with the additive. If the cartridge 11 cannot be installed in a vertical position, but in an inclined position, the displacement body 113 ensures that no additive can leak out.

If the cartridge 11 is disassembled because the additive has been used up, the displacement body 113 finds another advantageous use. The cartridge 11 is completely filled with fluid during disassembly. If the cartridge 11 is removed, the fluid could spill, particularly if the cartridge 11 is not in a vertical position. However, part of the fluid is displaced by the displacement body 113. If the cartridge 11 is disassembled, any fluid that was in the inlet passage 121 or in the outlet passage 122 or in the cartridge neck 31 can flow into the space released by the displacement body 113, so that the cartridge 11 is no longer completely filled with fluid and is therefore removed, without any fluid leaking out and getting into the environment.

Figure 9:
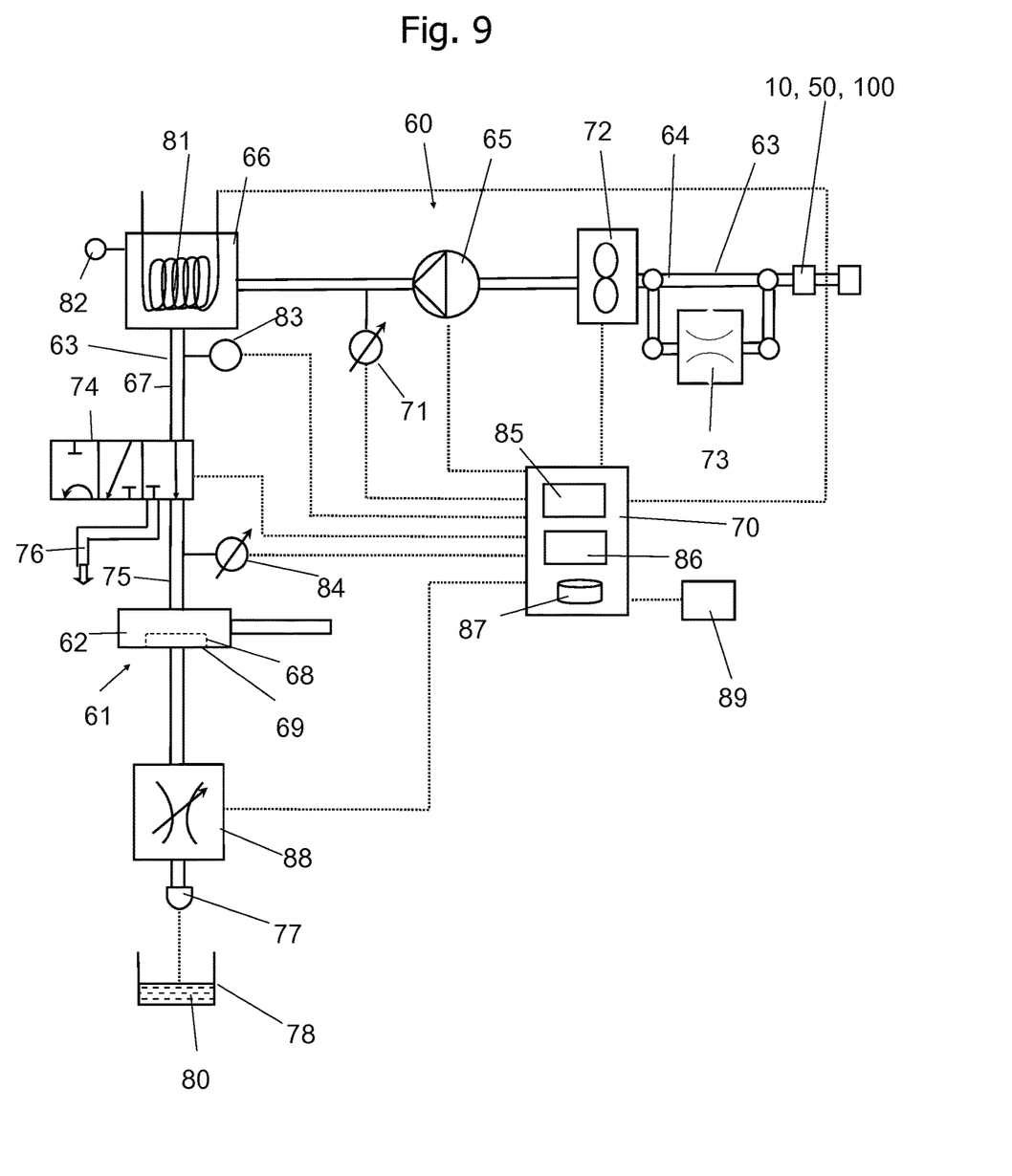

FIG. 9 shows an embodiment for the use of the device of one of the preceding embodiments for a device for preparing a hot beverage. The device can be part of a system 60 for producing an extract 80 from an extraction material 68 using an extractant 63, comprising a supply line 64 for the extractant 63, a heating device 66, a brewing device 61 and an extract collection recipient 78. If the system 60 is to be used to produce a hot beverage, the extractant 63 can be water. For this application, the supply line 64 is connected to a water connection. The water connection can be configured as a reservoir, tank, or water pipe. If necessary, the water connection can contain a water treatment system, for example a descaling system. The pressure of the extractant 63 is in the range between one and two bar, the pressure can essentially correspond to the pressure that is provided in the water line.

A device 10, 50, 100 of one of the preceding embodiments can be arranged at any desired location on the supply line 64.

The supply line 64 is configured to supply the extractant 63 to the heating device 66. According to the present embodiment, the heating device 66 contains heating elements 81 for heating the extractant 63. A temperature measuring device 82 can be provided for determining the temperature prevailing in the heating device 66. The temperature measuring device 82 can comprise a temperature sensor or temperature probe.

A connecting line 67 is provided for the heated extractant 63 from the heating device 66 to the brewing device 61. A temperature measuring device 83 can be arranged in the connecting line 67, preferably directly where it is connected to the heating device 66.

According to FIG. 9, the brewing device 61 includes a pressure vessel 62. The extraction material 68 is arranged in the interior of this pressure vessel 62 and is therefore shown schematically. In the supply line 64 there is a means for increasing the pressure of the extractant 63, for example a pump 65. The supply line 64, the heating device 66, the connecting line 67 and the brewing device 61 form a closed system so that, apart from line losses, no pressure losses occur in the system and the pressure of the heated extractant 63 essentially corresponds to the pressure applied by the means for increasing the pressure. The extraction material 68 can be arranged in or on a receiving element 69, which can be configured as a filter holder, capsule, bag or pad for use in preparing a hot beverage. For the preparation of a hot beverage, the pressure is usually in a pressure range from 5 up to and including 20 bar.

According to the present embodiment, a pressure sensor 71 is provided in the supply line 64 between the pump 65 and the heating device 66. The pressure generated by the pump 65 can be measured by means of the pressure sensor 71. The measured pressure value determined by the pressure sensor 71 is transmitted to a control unit 70. In addition, the pump 65 can contain an angular speed sensor or a flow meter, by means of which the volume flow flowing through the pump 65 or the throughput can be determined. The corresponding measured value for the angular speed, the volume flow or the throughput can also be transmitted to the control unit 70. According to this embodiment, a flow meter 72 is therefore located directly on the pump 65 and not upstream of the pump 65, as is shown as a possible variant in FIG. 9. Of course, the flow meter 72 can also be located upstream of the pump 65.

Optionally, the extractant 63 can be metered by means of a control valve 73. For this purpose, the control valve 73 can be controlled by the control unit 70 in such a way that the control valve 73 is closed when the measured value of the volume flow corresponds to the proportion of the heated extractant 63 required in a specific phase of the extraction process, which is to be fed to the brewing device 61. A metering specification for metering the extractant 63 can include a single phase or a plurality of phases. The control valve 73 can in particular be configured as a proportional valve.

The use of a pressurizing means for the extractant 63 in the supply line 64 enables the generation of a flow profile or a plurality of flow profiles which are overlaid by minimum pressure profiles or maximum pressure profiles. This means that by adjusting the pump 65 or the control valve 73, correspondingly different pressures or volume flows can be set. The pressures or volume flows can be changed during the duration of an extraction process, that is to say the extraction process can comprise a number of phases, wherein each of the phases can be characterized by a different pressure or volume flow.

This means that the volume flow or the pressure in the supply line 64 downstream of the pressurizing means can be changed during the duration of an extraction process. Consequently, the volume flow or the pressure in the connecting line 67 can also be changed.

A multi-way valve 74 can optionally be arranged in the connecting line 67. The multi-way valve 74 is located between the heating device 66 and the brewing device 61. According to the present embodiment, the multi-way valve 74 has three different combinations of fluid connections; it is configured as a three-way valve. According to this embodiment, the multi-way valve 74 has three different positions and three fluid lines. One of these fluid lines is the connecting line 67, through which heated extractant 63 can be supplied to the multi-way valve 74. Another, second fluid line is the connecting line 75, through which the heated extractant 63 can be supplied to the brewing device 61. A third fluid line can be provided, which is configured as a waste water line 76 for supplying the heated extractant 63 to a waste water tank or waste water channel.

In the first position of the multi-way valve 74, the connecting line 67 is connected to the connecting line 75 for carrying out an extraction process. The connection to the waste water line 76 is interrupted in the first position, so that no heated extractant 63 is supplied to the waste water line 76.

In the second position of the multi-way valve 74, the connecting line 67 is connected to the waste water line 76. The connection to the connecting line 75 is interrupted in the second position, so that no heated extractant 63 is supplied to the connecting line 75. In the second position, the connecting line 67 and the supply line 64 can be flushed.

This can be advantageous in order to preheat the connecting line 67 and the multi-way valve 74 with heated extractant 63 in order to set the temperature precisely for a subsequent extraction. Therefore, optimal temperature conditions for the extraction can be achieved. In particular, any temperature profiles can be set exactly, in particular by means of the control unit 70. The control unit 70 includes a computing unit 85, a comparison unit 86 and a memory unit 87. The memory unit 87 contains a plurality of metering specifications, which contain the desired volume flows and the desired temperatures of the extractant 63 for the production of the extract 80. One of the metering specifications, which comprises the desired volume flow and the desired temperature of the heated extractant 63, can be selected by means of an input device 89. The opening time of the control valve 73 can be determined from the desired volume flow by means of the computing unit 85. The measured volume flow value can be compared with the desired volume flow by means of the comparison unit 86, so that the control valve 73 can be adjusted in such a way that the desired volume flow corresponds to the measured volume flow value.

In the third position of the multi-way valve 74, a connection between the connecting line 75 and the waste water line 76 can be established. The connection to the connecting line 67 is interrupted in the third position. A pressure in the pressure vessel 62 that is still elevated compared to the environment can be reduced especially at the end of an extraction. The waste water line 76 can also be used to drain water containing a descaling agent before it enters the brewing device 61 so that no descaling agent can enter the brewing device.

The multi-way valve 74 can have two or three of the positions described, which means that a two-way valve can also be provided instead of the three-way valve shown.

The brewing device 61 contains the extraction material 68. The brewing device 61 contains a receiving element 69 for the extraction material 68, which is permeable to the heated extractant 63, so that the extract 80 can be obtained through contact of the heated extractant 63 with the extraction material 68. The extract 80 leaves the brewing device via the outlet 77 in order to fill up an extract collection recipient 78 at least partially. The extract collection recipient 78 is configured to collect the extract 80. The extract collection recipient 78 can in particular comprise a cup for receiving a hot beverage.

The pressure prevailing in the connecting line 75 can be measured using a pressure gauge 84. The measured pressure value can be transmitted to the control unit 70. The measured pressure value determined with the pressure gauge 84 can be used by means of the computing unit 85 located in the control unit 70 and the comparison unit 86 for overlaying the pressure profile which characterizes the extraction process.

The extraction process can thus be controlled as desired by means of the control unit 70 because different flow rates, pressures, temperatures and pauses between individual brewing or extraction phases can be set.

According to the present embodiment, the connecting line 67, the multi-way valve 74, the connecting line 75, the brewing device 61, the valve 88 and the outlet 77 can be preheated by means of heated extractant when there is no extraction material 68 in the brewing device. Thus, during the actual extraction process, there is no or only an insignificant cooling of the heated extractant until it reaches the extraction material 68. Therefore, the temperature of the heated extractant can be precisely adjusted, so that an improved temperature stability can be achieved during the extraction process.

According to each of the embodiments, the extraction material 68 can be extracted with a pressure that is essentially the same for the entire extraction material 68, so that a more uniform extraction with improved mass transfer from the extraction material 68 into the heated extractant 63 can take place, so that the concentration of the soluble components of the extraction material in the extract 80 is increased.

It is obvious to a person skilled in the art that many other variants are possible in addition to the exemplary embodiments described, without departing from the inventive concept. The subject of the invention is thus not limited by the foregoing description and is to be determined by the scope of protection defined by the claims. For the interpretation of the claims or the description, the broadest possible reading of the claims is decisive. In particular, the terms "include" or "contain" shall be construed as referring to elements, components or steps in a non-exclusive sense, thereby indicating that the elements, components or steps may be present or used that they can be combined with other elements, components or steps that are not explicitly mentioned. When the claims relate to an element or component from a group that may consist of A, B, C to N elements or components, this language should be interpreted as requiring only a single element of that group, and not one combination of A and N, B and N or any other combination of two or more elements or components of this group.

The invention claimed is:

1. A device for metering an additive into a fluid containing a valve body, a fluid inlet and a fluid outlet, wherein a first channel system in the valve body extends between the fluid inlet and the fluid outlet in the valve body and a second channel system extends between the fluid inlet and the fluid outlet, such that in an operating state a fluid can flow either through the first channel system from the fluid inlet to the fluid outlet or through the second channel system from the fluid inlet to the fluid outlet, wherein the valve body contains a docking element which is configured for docking a cartridge for an additive, wherein a switchover device is provided which is configured to be switched if the cartridge is docked such that the second channel system is fluidically connected to the cartridge when the cartridge is connected to the docking element, wherein the docking element includes an internal thread configured to engage an external thread on a cartridge neck.

2. The device of claim 1, wherein the switchover device includes an inlet passage for supplying fluid to the cartridge and an outlet passage for removing the fluid loaded with the additive from the cartridge.

3. The device of claim 1, wherein the fluid inlet is connected to the fluid outlet via an overflow passage if no addition of the additive is required.

4. The device of claim 3, wherein the overflow passage is formed between a cover and the switchover device when the switchover device is in a first position.

5. The device of claim 3, wherein the overflow passage is closed when the switchover device is in a second position.

6. The device of claim 1, wherein the switchover device comprises an inlet plunger and an outlet plunger and a separating element.

7. The device of claim 6, wherein the inlet plunger comprises a base body and a base element, wherein a shoulder of the inlet plunger is configured as a transition between the base body and the base element of the inlet plunger, wherein the outlet plunger comprises a base body and a base element, wherein a shoulder of the outlet plunger is configured as a transition between the base body and the base element of the outlet plunger.

8. The device of claim 7, wherein the base element of the inlet plunger includes an axial bore, wherein a first spring element is disposed in the axial bore, wherein the base element of the outlet plunger includes an axial bore, wherein a second spring element is disposed in the axial bore of the outlet plunger.

9. The device of claim 7, wherein an inlet seal is arranged on the shoulder of the inlet plunger, wherein an outlet seal is arranged on the shoulder of the outlet plunger.

10. The device of claim 1, wherein the switchover device can be switched from a first position to a second position by docking the cartridge, wherein in the second position an inlet passage is open for supplying the fluid to the cartridge and an outlet passage is open for withdrawing the fluid loaded with the additive from the cartridge.

11. The device of claim 1, wherein the switchover device comprises a displacement body.

12. The device of claim 1, wherein the docking element is arranged in a recess of the valve body.

13. The device of claim 1, wherein the valve body includes a seal arranged between the fluid inlet or the fluid outlet and the docking element.

14. A method for metering an additive into a fluid, comprising a device containing a valve body, a fluid inlet and a fluid outlet, wherein a first channel system in the valve body extends between the fluid inlet and the fluid outlet and a second channel system extends between the fluid inlet and the fluid outlet, such that a fluid can flow in an operating state either through the first channel system from the fluid inlet to the fluid outlet or through the second channel system from the fluid inlet to the fluid outlet, wherein no additive is added to the fluid when the fluid is passed through the first channel system, wherein the additive is added to the fluid when the fluid is passed through the second channel system, wherein a docking element includes an internal thread configured to engage an external thread on a cartridge neck.

* * * * *